Nov. 22, 1938.  W. T. McCULLOUGH  2,137,778

PLANETARY GEARED REDUCTION DEVICE

Filed June 25, 1937

Inventor
William T. McCullough
Clarence F. Poole
Attorney

Patented Nov. 22, 1938

2,137,778

UNITED STATES PATENT OFFICE 2,137,778

PLANETARY GEARED REDUCTION DEVICE

William T. McCullough, Chicago, Ill., assignor to Goodman Manufacturing Company, Chicago, Ill., a corporation of Illinois Application June 25, 1937, Serial No. 150,221

5 Claims. (Cl. 74—277)

This invention relates to improvements in planetary geared reduction devices and has as its principal objects to provide a planetary geared reduction device so constructed that a wide range of speeds may be obtained through a simplified and novel arrangement of clutches and shifting means.

Figure 1:
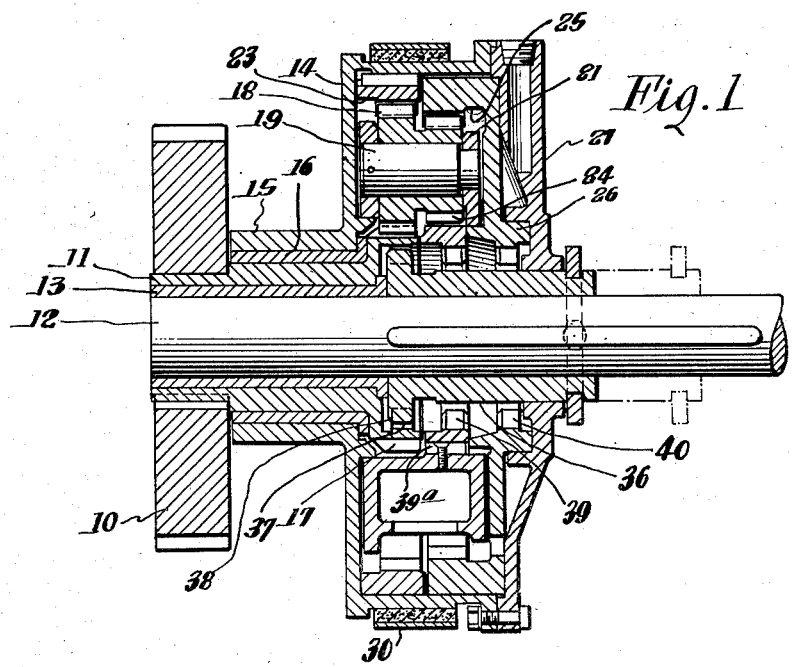
Figure 2:
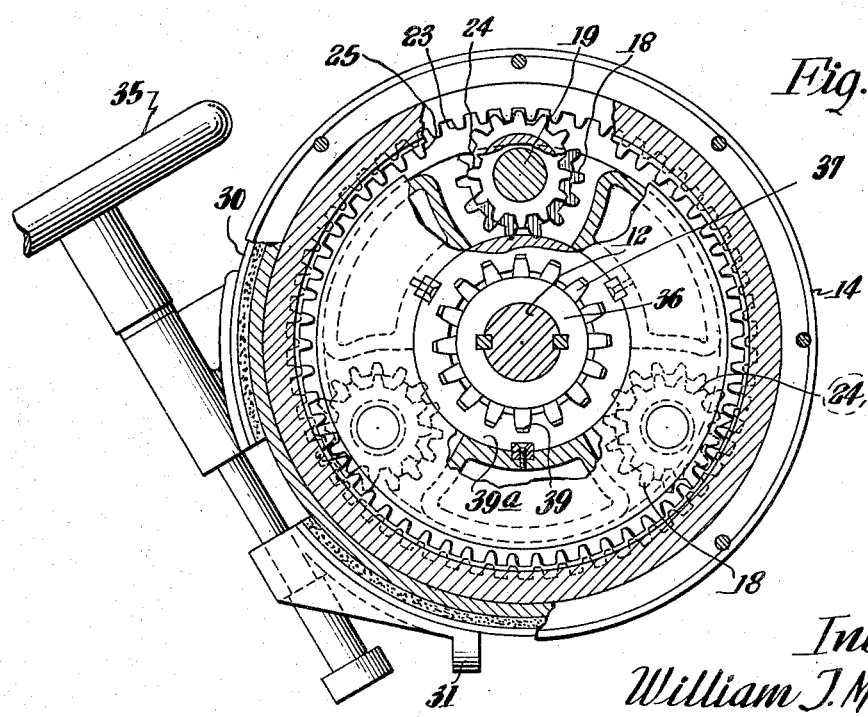

The invention may best be understood by reference to the accompanying drawing wherein:

Figure 1 is a longitudinal section of a planetary transmission unit constructed in accordance with my invention; and Figure 2 is a side elevation of the device shown in Figure 1 with certain parts broken away and shown in section in order to more clearly illustrate the details of my invention.

In the embodiment of my invention illustrated in the drawing, a spur gear 10 is shown as being keyed on a sleeve 11 which is journaled on a shaft 12 on a bearing member 13. Said sleeve extends within a casing 14. Said casing is provided with a hub 15 which is journaled on the sleeve 11 by means of a bearing member 16. The sleeve 11 is provided at its inner end with a spur pinion 17, herein shown as being integral therewith, which is disposed within the casing 14 and constitutes the sun gear of the transmission device. Said sun gear meshes with and drives planetary pinions 18, 18 freely mounted on a shaft 19 which is mounted in a cage 21. Said cage in turn is mounted within the casing 14 for free rotation with respect thereto. In the embodiment illustrated, three of such planetary pinions are provided, but it is manifest that more or less of said pinions may be employed if desired. The planetary pinions 18, 18 mesh with an internal gear 23 secured to the inside of the casing 14 and thus cause rotation of the cage 21 within said casing when said internal gear is held from rotation.

Planetary pinions 24, 24 are herein shown as being formed integral with and are disposed to one side of the planetary pinions 18, 18. Said planetary pinions are of a smaller diameter than the planetary pinions 18, 18 and are meshed with an internal gear 25 mounted within the casing 14 for free rotation with respect thereto. Said internal gear is provided with a flanged annular hub 26 having bearing in an end plate 27 for said casing.

When the casing 14 is held from rotation the planetary pinions 18, 18 and 24, 24 moving in an orbital path about the internal gear 23 will rotatably drive the internal gear 25 at a slower rate of speed than the speed of rotation of the cage 21.

The casing 14 may be held from rotation or permitted to rotate under the control of friction by means of a friction band 30 engaging the outer periphery thereof. Said friction band may be of any approved design and has a bracket 31 projecting therefrom which is adapted to engage a fixed abutment or the main frame of the machine which supports said geared reduction device. Adjustment of said friction band is attained by means of a hand wheel 35 or similar mechanism suitable for this purpose.

With reference now in particular to the novel means for obtaining three speeds from said planetary, two of which are frictionally controlled, a clutch sleeve 36 is feathered upon the shaft 12. Said sleeve has a flanged inner end disposed within the casing 14 which has clutch teeth 37 cut therein. Said teeth are adapted to mesh with internal clutch teeth 38 cut internally of the sun gear 17 for positively driving the shaft 12 at the speed of rotation of the sleeve 11.

In a like manner, clutch teeth 39 are cut internally of an annular ring 39a secured to the inner portion of the cage 21. Said clutch teeth are adapted to be meshed with the clutch teeth 37 upon shifting movement of the sleeve 36 along the shaft 12 for driving said shaft at the speed of rotation of said cage. The speed of rotation of said cage is slower than that of said sleeve by reason of the fact that said cage is rotatably driven within said casing by the planetary pinions 18, 18 orbitally moving about the internal gear 23 when said casing 14 is held from movement by means of the friction band 30. It will readily be apparent that said speed may be varied by varying the pressure of the friction band 30 on the outer periphery of said casing and thus permitting said casing to slip.

The third speed is obtained through clutch teeth 40, 40 cut internally of the hub of the internal gear 25 when meshed with the teeth 37 of the clutch sleeve 36. This will drive the shaft 12 at a relatively slow frictionally controlled speed which is the speed of rotation of the internal gear 25 driven by the planetary pinions 24, 24 orbitally moving within the casing 14.

It will be apparent from the foregoing that a simplified form of planetary gear reduction device has been provided affording three driving speeds, one of which is a direct drive and the other two of which are under the control of friction, and that a simplified form of clutch means has been provided for driving a shaft coaxial with the planetary casing at either one of these speeds which consists of a single clutch member shiftable along said shaft and through the intermediate speed clutch teeth to obtain either a high or low speed.

While I have herein shown and described one form in which my invention may be embodied, it will be understood that the construction thereof and the arrangement of the various parts may be altered without departing from the spirit and scope thereof. Furthermore, I do not wish to be construed as limiting myself to the specific embodiment illustrated, excepting as it may be limited in the appended claims.

I claim as my invention:

1. In a planetary transmission device, a driving gear, a shaft, a casing mounted coaxial of said shaft and driving gear, a sleeve freely mounted on said shaft and being driven by said driving gear and extending within said casing, a sun gear on the inner end of said sleeve, friction means engaging the outer periphery of said casing for controlling rotation thereof, a cage rotatably mounted within said casing, an internal gear fixed to said casing and another internal gear mounted within said casing for free rotation with respect thereto, planetary pinions mounted within said cage and meshing with said internal gears, and a single member slidable along said shaft and adapted to have selective engagement with said sleeve, cage, or second mentioned internal gear for driving said shaft at either the speed of rotation of said sleeve, cage, or second-mentioned internal gear.

2. In a planetary transmission device, a driving gear, a shaft, a casing mounted coaxial of said shaft and driving gear, a sleeve freely mounted on said shaft and being driven by said driving gear and extending within said casing, a sun gear on the inner end of said sleeve, friction means engaging the outer periphery of said casing for controlling rotation thereof, a cage rotatably mounted within said casing, an internal gear fixed to said casing and another internal gear mounted within said casing for free rotation with respect thereto, planetary pinions mounted within said cage and meshing with said internal gears, and selective drive connections to said shaft for driving said shaft at either the speed of rotation of said sleeve or the speed of rotation of said cage or internal gear comprising separate clutch jaws on said sleeve, cage and internal gear, and a single clutch member on said shaft and adapted to engage either of said clutch jaws, said clutch member passing through one set of clutch jaws to engage another set of clutch jaws.

3. In a planetary transmission device, a driving gear, a shaft, a casing mounted coaxial of said shaft and driving gear, a sleeve freely mounted on said shaft and being driven by said driving gear and extending within said casing, a sun gear on the inner end of said sleeve, friction means engaging the outer periphery of said casing for controlling rotation thereof, a cage rotatably mounted within said casing, an internal gear fixed to said casing and another internal gear mounted within said casing for free rotation with respect thereto, planetary pinions mounted within said cage and meshing with said internal gears, and selective drive connections to said shaft for driving said shaft at either the speed of rotation of said sleeve or the speed of rotation of said cage or internal gear comprising a set of internally formed clutch jaws on said sleeve, another set of internally formed clutch jaws on said cage, and a third set of internally formed clutch jaws on said internal gear, a clutch member on said shaft adapted to selectively engage either set of internally formed clutch jaws, said clutch jaws and clutch member being so arranged that it must pass through the intermediate set of clutch jaws to engage either the extreme high or extreme low set of clutch jaws.

4. In a planetary transmission device, a shaft, a driving gear freely mounted thereon, a rotatable casing concentric with said gear, friction means engaging said casing and varying the speed of rotation thereof, a rotatable cage mounted within said casing concentric with said casing and having a plurality of planetary pinions mounted therein, an internal gear secured to said casing and meshed with one of said planetary pinions, another internal gear concentric of said casing and meshed with another of said planetary pinions, said internal gear being mounted for free rotation with respect to said casing and forming a low speed driving unit, and means for driving said shaft at either the speed of rotation of said driving gear or at the speed of rotation of said cage or internal gear including interengaging clutch devices coaxial with said driving gear, cage, and low speed internal gear, and a clutch member on said shaft engageable with either of said clutch devices by movement along said shaft within said casing.

5. In a planetary transmission device, a shaft, a driving gear freely mounted thereon, a rotatable casing concentric with said gear, friction means engaging said casing and varying the speed of rotation thereof, a rotatable cage mounted within said casing concentric with said casing and having a plurality of planetary pinions mounted therein, an internal gear secured to said casing and meshed with one of said planetary pinions, another internal gear concentric of said casing and meshed with another of said planetary pinions, said internal gear being mounted for free rotation with respect to said casing and forming a low speed driving unit, interengaging clutch devices coaxial with said driving gear, cage, and low speed internal gear for driving said shaft at either the speed of rotation of said driving gear, cage or internal gear including a set of internally formed clutch jaws on said sleeve, another set of internally formed clutch jaws on said cage, and a third set of internally formed clutch jaws on said internal gear and a clutch member on said shaft adapted to selectively engage either set of internally formed clutch jaws, said clutch jaws and clutch member being so arranged that said clutch member must pass through the intermediate set of clutch jaws to engage either the extreme high or extreme low set of clutch jaws.

WILLIAM T. McCULLOUGH.